United States Patent
Shahin

(10) Patent No.: US 12,338,865 B2
(45) Date of Patent: Jun. 24, 2025

(54) BRAKE CALIPER FOR A DISK BRAKE SYSTEM

(71) Applicant: HL MANDO CORPORATION, Gyeonggi-do (KR)

(72) Inventor: Hatem Shahin, Pfaffenhofen (DE)

(73) Assignee: HL MANDO CORPORATION, Gyeonggi-do (KR)

( * ) Notice: Subject to any disclaimer, the term of this patent is extended or adjusted under 35 U.S.C. 154(b) by 565 days.

(21) Appl. No.: 17/752,838

(22) Filed: May 24, 2022

(65) Prior Publication Data

US 2023/0235800 A1    Jul. 27, 2023

(30) Foreign Application Priority Data

Jan. 27, 2022  (DE) .......................... 102022200922.3

(51) Int. Cl.
  *F16D 65/00*   (2006.01)
  *F16D 55/00*   (2006.01)

(52) U.S. Cl.
  CPC ..... *F16D 65/0068* (2013.01); *F16D 65/0056* (2013.01); *F16D 65/0087* (2013.01); *F16D 2055/0008* (2013.01); *F16D 2055/0016* (2013.01); *F16D 2250/0084* (2013.01)

(58) Field of Classification Search
  CPC ......... F16D 2065/1392; F16D 65/0006; F16D 2055/0016; F16D 2055/0008; F16D 65/0056; F16D 65/0068; F16D 65/0087; F16D 2250/0084
  See application file for complete search history.

(56) References Cited

U.S. PATENT DOCUMENTS

| 5,099,961 A | 3/1992 | Dreilich et al. |
| 5,317,850 A * | 6/1994 | Colonias ................. E04H 9/021 52/294 |
| 2012/0024643 A1* | 2/2012 | Crippa ................ F16D 65/0018 188/234 |

(Continued)

FOREIGN PATENT DOCUMENTS

| DE | 29 46 336 | 5/1980 |
| DE | 35 08 039 | 1/1986 |
| DE | 10 2004 055 527 | 5/2006 |

(Continued)

OTHER PUBLICATIONS

DE 10305308 A1 (Apr. 22, 2004) (Year: 2004).*

(Continued)

*Primary Examiner* — Robert A. Siconolfi
*Assistant Examiner* — Mahbubur Rashid
(74) *Attorney, Agent, or Firm* — WOMBLE BOND DICKINSON (US) LLP

(57) ABSTRACT

The application relates to a brake caliper for a disk brake system comprising a caliper bracket, a caliper housing, a first connecting means and a second connecting means, wherein the first connecting means and the second connecting means may each be configured to mount the caliper bracket to the caliper housing or wherein the first connecting means and the second connecting means may each be configured to mount the caliper bracket to an axle assembly, characterized in that a mass of the first connecting means is different from a mass of the second connecting means.

11 Claims, 8 Drawing Sheets

(56) References Cited

U.S. PATENT DOCUMENTS

2016/0341268 A1* 11/2016 Mallmann ............ F16D 65/0018

FOREIGN PATENT DOCUMENTS

| DE | 10 2014 001 061 | 7/2015 |
| DE | 102016008271 | 1/2018 |
| EP | 2 767 725 | 8/2014 |
| JP | 2003-227529 | 8/2003 |
| KR | 10-2008-0101487 | 11/2008 |
| WO | 2006/133916 | 12/2006 |

OTHER PUBLICATIONS

DE 4020668 A1 (Jan. 2, 1992) (Year: 1992).*
JP H0861401 A (Mar. 8, 1996) (Year: 1996).*
Office Action dated Sep. 29, 2022 for German Patent Application No. 10 2022 200 922.3 and its English machine translation by Google Translate.

* cited by examiner

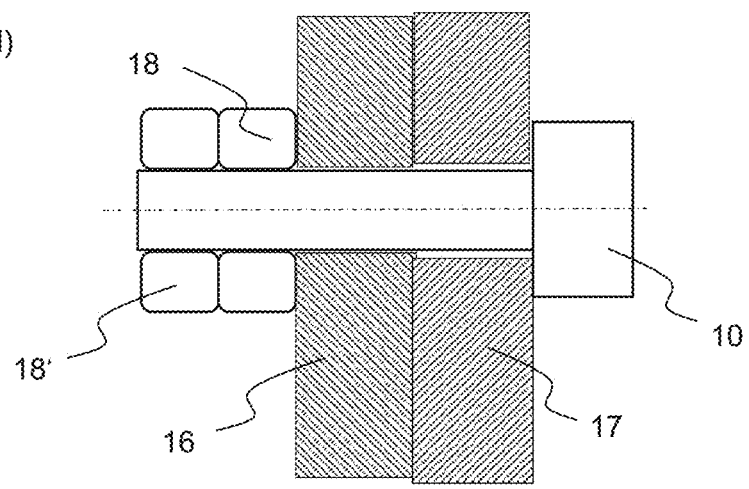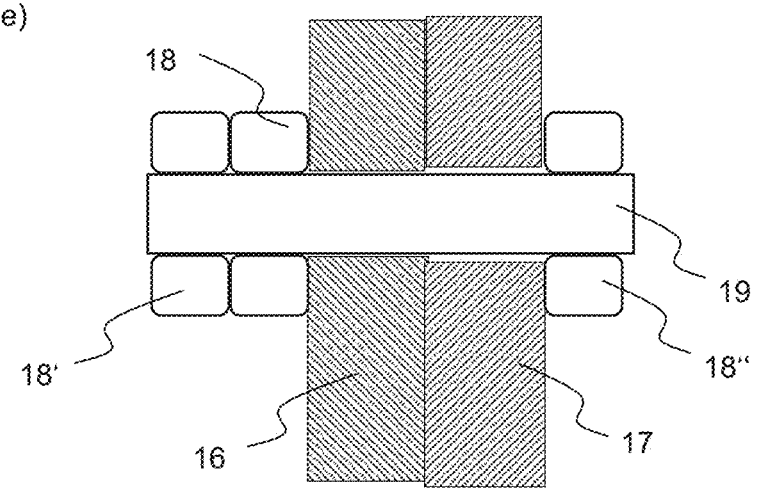

BRAKE CALIPER FOR A DISK BRAKE SYSTEM

TECHNICAL FIELD

The application relates to a brake caliper for a disk brake system.

BACKGROUND ART

Brake Engineers are in search for robust solutions to suppress squeal noises (tonal loud noises typically appearing in frequencies between 1000 and 16000 Hz) in disk brake systems. Different solutions are known to improve the noise, vibration, and harshness (NVH) characteristics, including a steel shim glued to a back side of a back plate of a brake pad assembly, different chamfers on a pad of the brake pad assembly, slots on pad surfaces contacting the disk, modifications of friction material of the brake pads, an underlayer connecting the friction material to the back plate. The main effect of the shim is to decouple system modes from each other. While these solutions can help improve the squeal noise characteristics, in most cases these solutions work well only under specific braking conditions (low or high frequency, cold or warm temperature). Prior art can be found, e.g., in document DE 197 06 122 A1. Another approach may be using a beneficial mass distribution on certain components like a caliper bracket or a caliper housing. This approach can, however, require some effort including computer-aided engineering, which can be time consuming and expensive. Also, physically changing a shape of the caliper bracket or caliper housing to reduce noise can involve lengthy and costly manufacturing effort, which may include elaborate casting procedures.

SUMMARY

In view of the above-mentioned aspects, it is an object of the present invention to provide an improved brake caliper for a disk brake system. In particular, it is an object of the application to provide a compact and robust brake caliper at a low cost, which allows to quickly provide a brake system that reliably suppresses noise, in particular squeal noise.

This objective is achieved by a brake caliper for a disk brake system comprising the features of claim 1. Optional further features and further developments will become apparent from the dependent claims and the detailed description in conjunction with the accompanying figures.

The proposed brake caliper for a disk brake system comprises a caliper bracket and a caliper housing. The brake caliper further comprises a first connecting means and a second connecting means. The first connecting means and the second connecting means may each be configured to mount the caliper bracket to the caliper housing. Alternatively, the first connecting means and the second connecting means may each be configured to mount the caliper bracket to an axle assembly. A mass of the first connecting means is different from a mass of the second connecting means.

The proposed brake caliper enables a fast and easy way to suppress noise, in particular squeal noise, in a disk brake system. By providing a mass of the first connecting means that it is different from a mass of the second connecting means, the vibrational characteristics of the disk brake system can be effectively improved without necessarily changing the shape of the brake caliper and/or of the caliper housing. Thereby, the proposed brake caliper enables fast optimization of the noise characteristics. Two components, e.g., a pair of the caliper housing, the brake caliper and the axle assembly, are typically mounted to one another using a pair of connecting means, e.g., a pair of bolts. The pair of bolts used in known brake calipers typically have the same mass. By providing different masses of the first and second connecting means, noise generation may be effectively reduced by providing additional masses or reduced masses in the region of interfaces between the two components. Thereby, joint damping, which is essential factor to dissipate noise energy, may be improved. Providing additional or reduced masses using the first and second connecting means enables a fast and easy optimization of the mass distribution of the disk brake system. Thereby, the vibration properties can be optimized for improved noise reduction without the need to make potentially costly and time-consuming amendments to other components the disk brake system, as the connecting means can be easily and quickly exchanged or modified. The first connecting means and/or the second connecting means may be mass vibration absorbers and may function as an absorption mass element to increase a damping effect. The first connecting means and/or the second connecting means may therefore serve the purposes of mounting the two components together and reducing noise at the same time. Further, the proposed brake caliper enables noise reduction by adding mass without influencing a stiffness of the system, e.g., influencing a component stiffness, connection stiffness or contact stiffness.

The proposed brake caliper enables a very fast development procedure to improve the noise characteristics of the disk brake system using the connecting means having different mass. A very fast solution to test and optimize the noise characteristics within a short time at low cost is provided. The application may further relate to a method for reducing noise in a disk brake system. The method may comprise a step of determining noise characteristics in a disk brake system having a brake caliper, which may be a brake caliper as discussed above or below. The method may further comprise a step of exchanging or changing at least one of a first connecting means and/or a second connecting means. The step of exchanging or changing may be performed such that a brake caliper as discussed above or below having a mass of the first connecting means that is different from a mass of the second connecting means is obtained afterwards. The method may further comprise a step of determining noise characteristics in a disk brake system having the obtained brake caliper. The step of exchanging or changing may be repeated. The obtained brake caliper may have improved noise characteristics.

The application may further relate to a disk brake system having the brake caliper as described above or below. The disk brake system may further comprise the axle assembly. Additionally or alternatively, the disk brake system may comprise a brake pad assembly and/or a brake disk. The brake pad assembly may be configured to slide with respect to the caliper bracket. The caliper bracket may be referred to as a mounting bracket and/or as a carrier. The brake pad assembly may be configured to slide with respect to the caliper bracket in an axial direction upon brake application. The axial direction may be parallel to an axis of rotation of the brake disk. In most embodiments, the disk brake system is a floating caliper brake. The disk brake system may comprise a brake piston. The caliper housing may comprise a caliper finger. The brake pad assembly may comprise a back plate having a front side for facing the brake disk and a friction layer arranged on the front side of the back plate for contacting a friction surface of the brake disk. The back plate may comprise a guiding protrusion configured to be slidably received within a guiding recess of the caliper bracket. The guiding protrusion may be an ear portion of the back plate. The guiding recess of the caliper bracket may be a guiding groove. The brake piston or caliper finger may be configured to push against a back side of the brake pad assembly to push the friction layer of the brake pad assembly against the friction surface of the brake disk.

The first connecting means and the second connecting means may each be configured to mount the caliper bracket to the axle assembly. The caliper bracket may be mounted to the axle assembly using exclusively the first connecting means and the second connecting means. The first connecting means and the second connecting means may be configured to provide a fixed connection between caliper bracket and axle assembly, such that the caliper bracket and the axle assemble cannot move relative to one another when mounted to one another using the first connecting means and the second connecting means. Typically, in this embodiment the first connecting means includes or is exclusively formed by a bolt and at least one nut. Further, the second connecting means may also include or be exclusively formed by a bolt and at least one nut.

In another embodiment, the first connecting means and the second connecting means are each configured to slidably mount the caliper bracket to the caliper housing. The first and second connecting means may each be fixed to a slider pin of the brake caliper. Typically, in this embodiment the first connecting means include or be exclusively formed by a bolt. Further, the second connecting means may also include or be exclusively formed by a bolt. The calliper bracket may be configured to slide along the slider pins in the axial direction. The slider pins may be fixed to caliper housing using the first and second connection means. The slider pins may be configured to be slidably received within holes of the caliper bracket. The first and second connecting means may be each be engaged with an inner thread on a respective slider pin. In typical embodiments, the first and second connecting means are arranged in the same radial position. The first and second connecting means may have the same spacing from an axis of rotation of the brake disk. The first and second connecting means may have a different tangential position. The first connecting means may be arranged in a leading portion of the brake caliper and the second connecting means may be arranged in a trailing portion of the brake caliper or vice versa.

In typical embodiments, a mass of the first connecting means is at least 10 g larger than a mass of the second connecting means. Further, in some examples, the mass of the first connecting means is at least 20 g, in particular at least 40 g, larger than the mass of the second connecting means. In this way, the brake caliper may enable particularly effective modification of the noise damping properties using the first and second connecting means. In most embodiments, the mass of the first connecting means is at most 200 g larger than the mass of the second connecting means.

In typical embodiments, the first connecting means and/or the second connecting means comprises a bolt. The first connecting means and/or the second connecting means may exclusively be formed by a bolt in some embodiments. In further embodiments, the first connecting means and/or the second connecting means may comprise or exclusively be formed by a one or more of a screw, and a threaded rod. The threaded rod may be a stud. The first connecting means and/or the second connecting means may further comprise a nut and/or a washer.

The bolt or bolts may comprise a bolt head. The bolt or bolts may further comprise a threaded surface. For example, the bolt head of at least one of the connecting means may form an additional mass that leads to the mass difference of the two connecting means. The bolt or bolts may be one of hexagonal-headed bolts, square-headed bolts, cap-headed bolts, T-headed bolts, countersunk-headed bolts, eye bolts. In some embodiments, the first and/or second connecting means comprises a bolt and a nut and may be, e.g., a stove bolt and nut, a carriage bolt and nut, a hook bolt and nut, or an expansion bolt and nut. The nut of at least one of the connecting means may form an additional mass that leads to the mass difference of the two connecting means. The nut may be one of a hexagonal nut, a square nut, a ring nut, a cap nut, a lock nut, a cylindrical nut, a dome nut, or a wing or thumb nut. In some embodiments, the bolt or bolts or the stud or studs are hollow. Further, the washer or washers of at least one of the connecting means may form an additional mass that leads to the mass difference of the two connecting means.

In typical embodiments, the first connecting means and the second connecting means each comprise a corresponding body. The corresponding body of the first connecting means as well as the corresponding body of the second connecting means may each be one of a bolt, a screw, a nut, a washer, and a threaded rod. The corresponding body of the first connecting means may have a mass that is different from a mass of the corresponding body of the second connecting means. For example, the corresponding bodies of the first and second connecting means may correspond to one another in shape and/or function. For example, both the first connecting means and the second connecting means may comprise one of a bolt, a screw, a nut, a washer, and a threaded rod. One of a bolt, a screw, a nut, a washer, and a threaded rod of the first connecting means and the same of a bolt, a screw, a nut, a washer, and a threaded rod of the second connecting means may have a different mass. A difference in the mass of the corresponding body of the first connecting means and the corresponding body of the second connecting means may be at least 10 g, in particular at least 20 g and/or at least 40 g. In this way, the brake caliper may enable particularly effective modification of the noise damping properties using the corresponding bodies of the first and second connecting means.

In some embodiments, the corresponding body of the first connecting means is made of a first material. The corresponding body of the second connecting means may be made of second material. The first material may have a different density than the second material. For example, the first material may be one of steel, grey cast, aluminium, plastic, or copper. The second material may be another one of steel, grey cast, aluminium, plastic, or copper. By using a different density of the first and second material, a mass difference between the first connecting element and the second connecting element may be achieved in a manner that does not require modifications in shape. In this way, the mass difference may be obtained for noise reduction in an efficient manner if there is not much room for shape modifications. In particular, the corresponding bodies of the first and second connecting means may have the same shape.

For an even more efficient optimization of the mass distribution of the brake caliper for noise reduction, the first and second connecting means may have a different shape and/or dimension. For example, the corresponding body of the first connecting means may have a different shape and/or dimension than the corresponding body of the second connecting means. In some embodiments, the mass of one of the corresponding bodies is reduced with respect to the mass of the other one of the corresponding bodies. For example, the mass of one of the corresponding bodies may be reduced by removal of material, e.g., by drilling or milling. In this way, no new material is required as compared with an initial design so that modification of the noise characteristics is particularly easy to accomplish.

In some embodiments, a body of the first connecting means and/or a body of the second connecting means has an asymmetric mass distribution. This embodiment is particularly useful together with the feature of a mass of the first connecting means being different from a mass of the second connecting means for precise modification of the mass distribution of the brake caliper to reduce noise. However, providing an asymmetric mass distribution of the body of the first connecting means and/or the body of the second connecting means for precise control of the mass distribution of the brake caliper may also be advantageous without this feature. Therefore, the application may also relate to a brake caliper for a disk brake system comprising a caliper bracket, a caliper housing, and a first connecting means and a second connecting means, wherein the first connecting means and the second connecting means are each configured to mount the caliper bracket to the caliper housing or wherein the first connecting means and the second connecting means are each configured to mount the caliper bracket to an axle assembly, wherein a body of the first connecting means and/or a body of the second connecting means has an asymmetric mass distribution. The asymmetric mass distribution may be understood such that the body and/or its mass distribution has an n-fold rotational symmetry, with n being 2, or have no rotational symmetry, e.g., n equals 1. The latter achieves that the mass distribution of the brake caliper may be even more efficiently adjusted by rotating the body. Typically, the mass distribution of the body is asymmetric with respect to a rotational axis that coincides with the axial direction. For example, a centre of mass of the body does not coincide with a longitudinal axis of the body in some embodiments. The body of the first and second connecting means may be the corresponding bodies. For example, the body may be a bolt, having an asymmetric mass distribution. In some embodiments, a bolt of the first connecting means and/or a bolt of the second connecting means has a bolt head that is off-centre, e.g., with respect to a longitudinal axis of the bolt. In some embodiments, a washer of the first connecting means and/or a washer of the second connecting means has an asymmetric mass distribution. For example, the washer may have a hole that is off-centre with respect to an outer circumference of the washer. Additionally or alternatively, the outer circumference of the washer may not be circular.

BRIEF DESCRIPTION OF THE DRAWINGS

Exemplary embodiments will be described in conjunction with the following figures.

FIGS. 5(a) to (e) show schematic cross-sectional views of connecting means according to different embodiments.

DETAILED DESCRIPTION OF EMBODIMENTS

Figure 1:
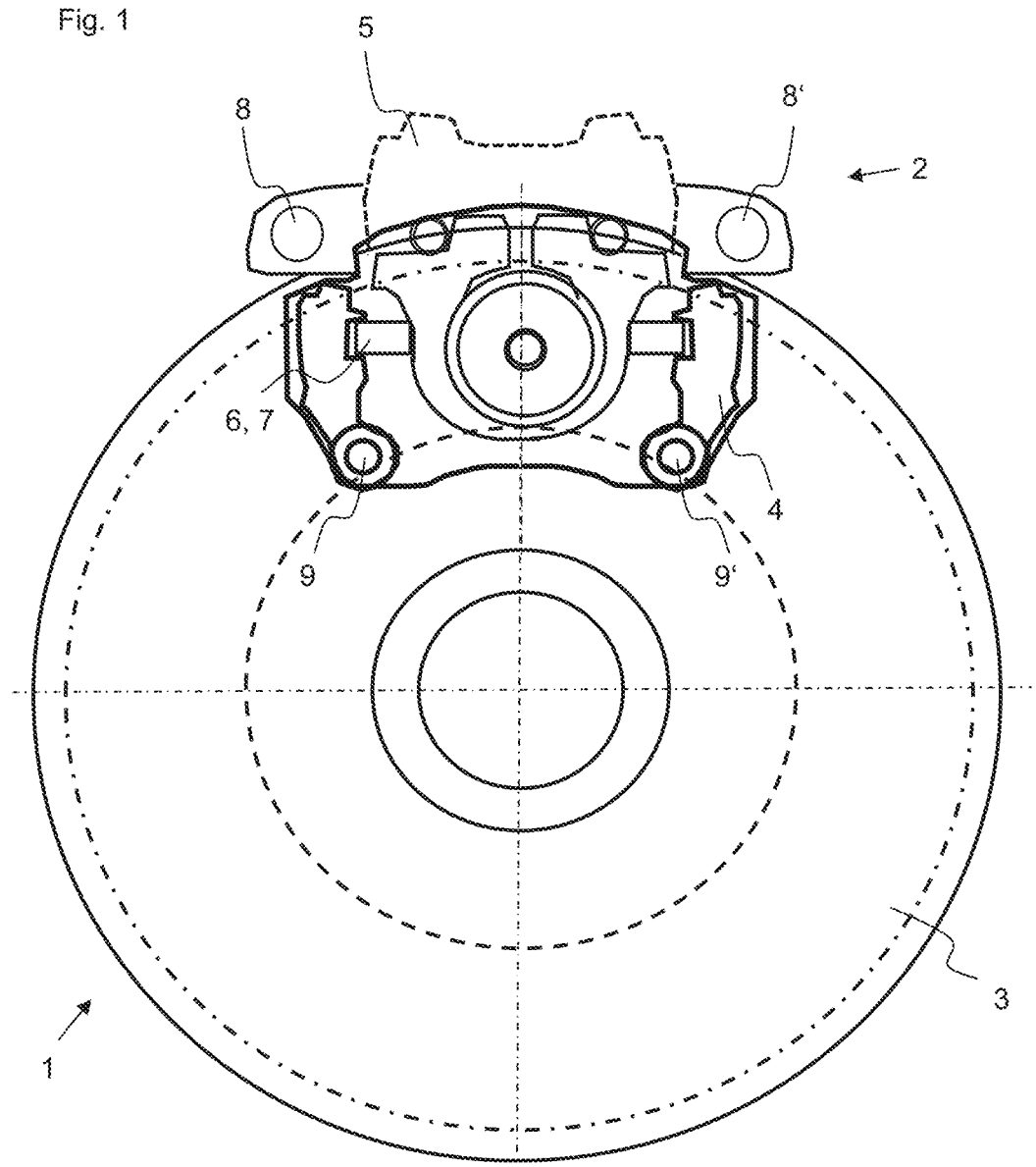
FIG. 1 shows a schematic view of a disk brake system having a caliper housing and a caliper bracket.
Figure 2A:
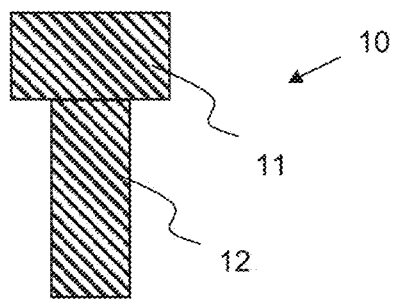
FIGS. 2(a) to (e) show cross-sectional views of bolts.
Figure 2B:
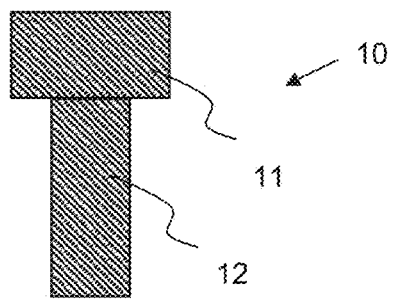
Figure 2C:
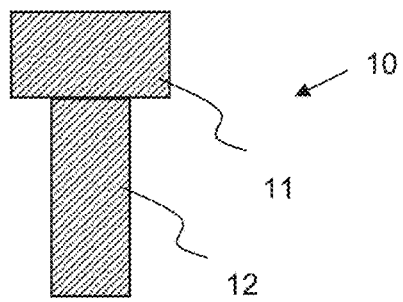
Figure 2D:
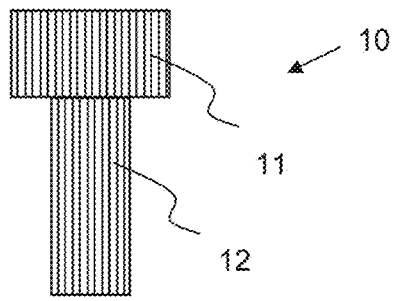
Figure 2E:
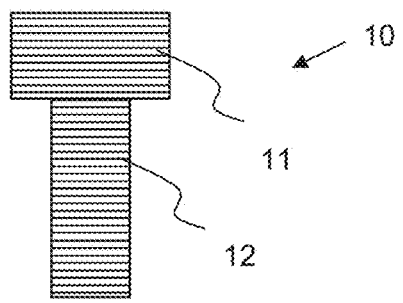
Figure 3A:
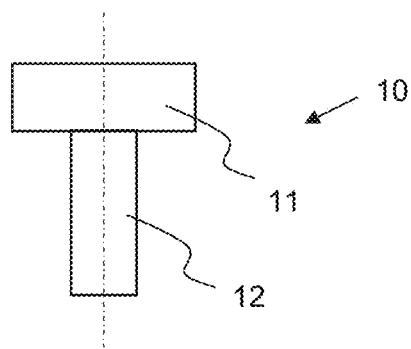
FIGS. 3(a) to (e) show cross-sectional views of bolts according to other embodiments.
Figure 3B:
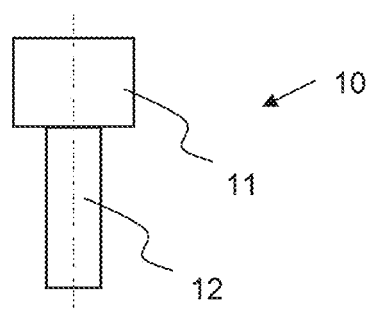
Figure 3C:
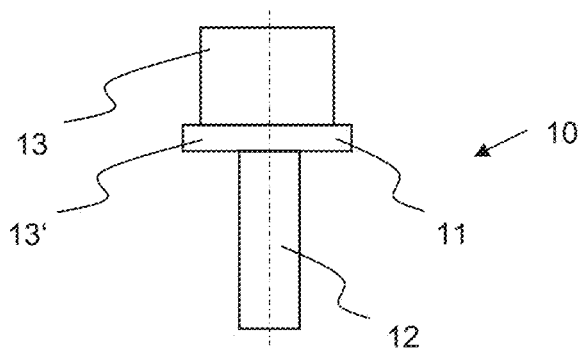
Figure 3D:
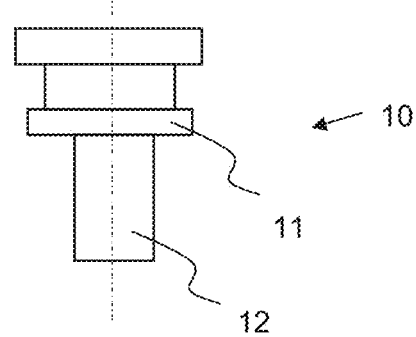
Figure 3E:
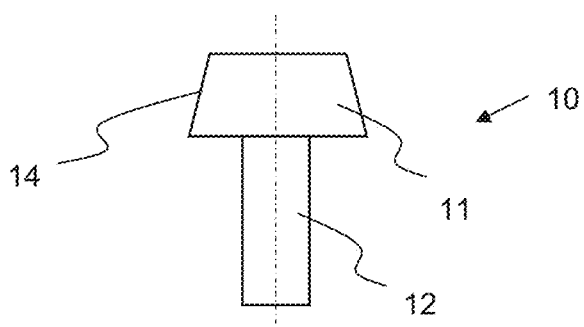
Figure 4A:
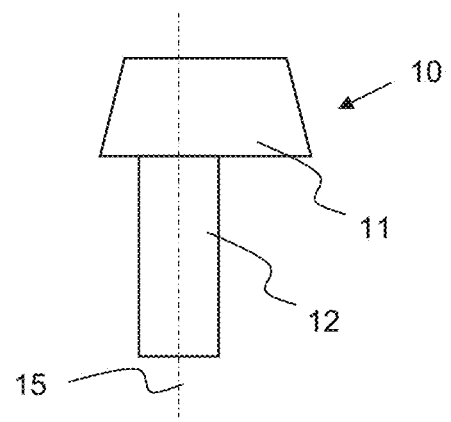
FIGS. 4(a) to (d) show schematic cross-sectional views of bolts according to other embodiments.
Figure 4B:
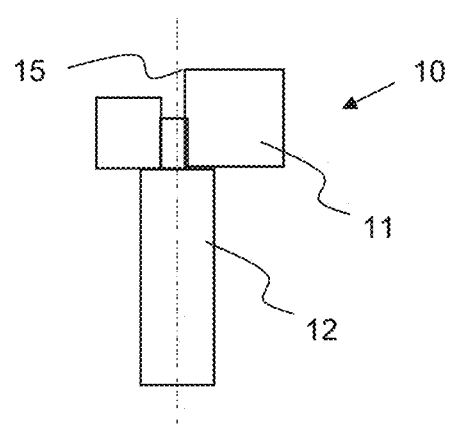
Figure 4C:
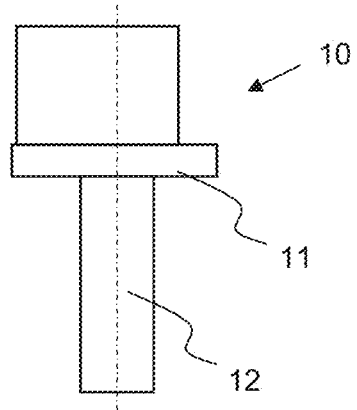
Figure 4D:
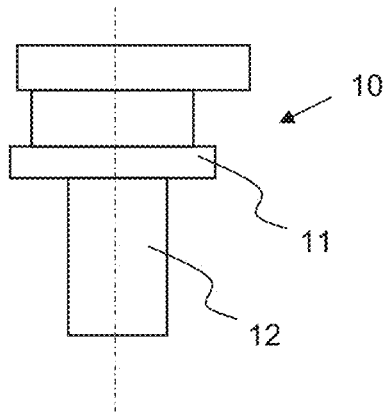

FIG. 1 shows a schematic view of a disk brake system 1 having a brake caliper 2 and a brake disk 3 having a friction surface. The disk brake system 1 is a floating caliper brake for a vehicle. The brake caliper 2 comprises a caliper bracket 4 and a caliper housing 5 having a caliper finger. The brake caliper 2 further comprises a brake piston. The brake caliper 2 comprises a pair of brake pad assemblies on either side of the brake disk 3. One of the brake pad assemblies is denoted using reference numeral 6. The brake pad assemblies each comprise a brake pad 7, which is slidably received within a recess of the caliper bracket 4. The brake pad 7 may have a back plate with a pair of guiding protrusions formed at the two tangential sides of the back plate. Each of the guiding protrusion may be received within a respective guiding recess of the caliper bracket 4. The brake pad 7 is attached relative to the caliper finger or to the brake piston such that upon application of the brake the caliper finger or the brake piston pushes the brake pad 7 in an axial direction toward the brake disk 3. The brake pad 7 has a friction layer, which is pushed against a friction surface of the brake disk 3 upon actuation of the disk brake system, e.g., hydraulic or electric actuation. The friction layer contains a material that shows a good stopping performance and heat transfer when engaging with the brake disk 3. The friction layer is attached to a front side of the back plate, which provides structural stability to the brake pad 7. In most embodiments, the back plate is made of a metal, in particular steel. A thickness of the back plate may be, e.g., 5 mm. The friction layer can have a thickness of at least 8 mm and/or at most 15 mm, for example. The material of the friction layer can for instance comprise at least one of copper, iron sulphide, graphite, zinc powder, basalt, calcium carbonate, tin sulphide, zinc aluminium, phenolic resin, rubber dust and mineral fibre. These materials show good stopping performance and heat transfer when engaging with the brake disk 3.

A pair of fasteners is formed by a first connecting means 8 and a second connecting means 8', which connect the caliper bracket 4 with the caliper housing 5. The connecting means 8, 8' may each comprise a bolt. The bolts of the first connecting means 8, 8' may penetrate holes within the caliper housing 5 and threaded outer surfaces of the bolts may mate with respective inner threads of a pair of slider pins. The slider pins may be received within the caliper bracket 4 such that the caliper bracket 4 can slide in the axial direction with respect to the caliper housing 5. The first and second connecting means 8, 8' may comprise a screw, a nut, a washer or a threaded rod it addition to the bolts or instead of the bolts.

Another pair of fasteners is formed by another set of first connecting means 9 and second connecting means 9'. These first and second connecting means 9, 9' fixedly mount the caliper bracket 4 to an axle assembly of the vehicle. These first and second connecting means 9, 9' typically each comprise a bolt, a screw or a threaded rod. Further, the first and second connecting means 9, 9' typically each comprise a nut to secure the bolt, screw or threaded rod. Further, the first and second connecting means 9, 9' typically each comprise at least one washer.

The first and second connection means differ in mass, e.g., by 50 g, to effectively improve mass vibrational damping in joint portions and to thereby reduce noise generated by the disk brake system. One of the first and second connection means may have an additional mass or a reduced mass with respect to the other one of the first and second connection means. Optimizing the mass distribution of the carrier by changing the mass of at least one of the first and second connection means is a fast and cost-efficient way to improve the noise characteristics of the disk brake system.

It is possible to achieve a different mass of the first and second connection means by using a different density of the material. For example, the first and second connection means and/or bodies, e.g., corresponding bodies, thereof may be made of different materials. For example, bolts 10 of the connection means may be made of materials having a different mass density. The bolts 10 each comprise a bolt head 11 and a threaded shaft 12. As illustrated in FIGS. 2(a) to 2(e), respectively, the bolts 10 may be made of steel, grey cast, aluminum, plastic or copper. Corresponding and reoccurring features shown in the different figures are denoted using the same reference numerals. The first connection means 8, 9 can have a bolt 10 that is made of a material different from a material the second connection means 8', 9' is made of. The bolts 10 as illustrated in FIGS. 2(a) to 2(e) all have the same shape and dimension. However, in other embodiments, the bolts 10 may have different shapes and dimensions.

As illustrated by FIGS. 3(a) to 3(e), the corresponding bodies, e.g., the bolts 10, of the first connection means 8, 9 and the second connection means 8', 9' may have different shapes. In addition, these corresponding bodies may have different mass densities as described above. For example, the first connection means 8, 9 may include one of the bolts 10 illustrated in FIGS. 3(a) to 3(e), and the second connection means 8', 9' may include another one of the bolts 10 illustrated in FIGS. 3(a) to 3(e). The bolts 10 may have differently shaped and/or dimensioned bolt heads 11 to achieve a different mass of the first connection means 8, 9 with respect to the other 8', 9'. To achieve the additional mass, a bolt 10 may, for example, comprise a bolt head 11 having sections 13, 13' of different diameter or a slanted outer surface 14.

FIGS. 4(a) to 4(d) illustrate that the corresponding bodies, e.g., the bolts 10, of the first connection means 8, 9 and the second connection means 8', 9' can each have an asymmetric mass distribution. The asymmetric mass distribution may be achieved by the illustrated shapes of the bolt heads 11, which lead to a centre of mass that that does not coincide with the longitudinal axis of the bolts. The longitudinal axis 15 of the bolts may be parallel to an axis of rotation of the brake disk as illustrated.

Figure 5A:
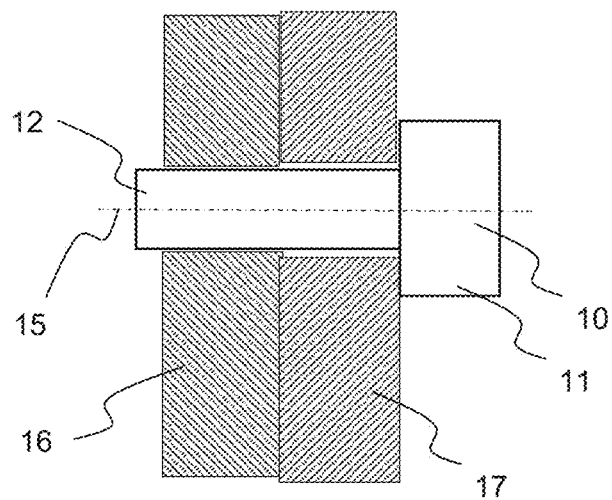
Figure 5B:
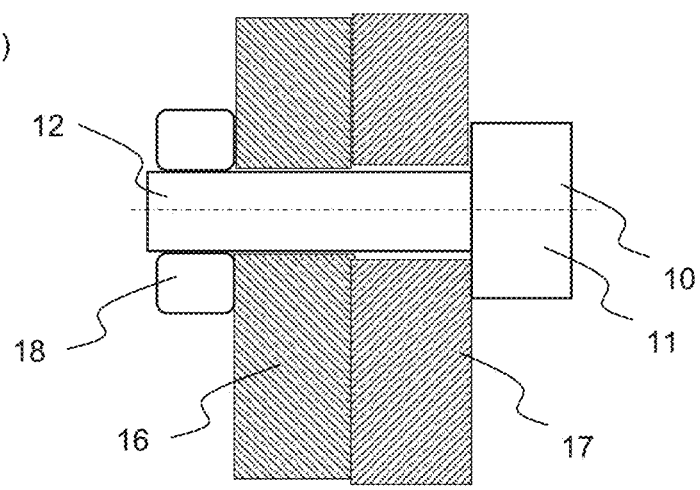
Figure 5C:
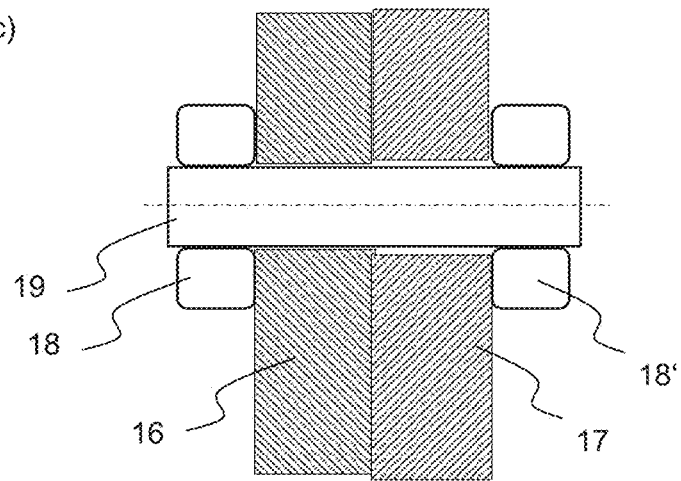

FIGS. 5(a) to 5(e) show different arrangements of connecting means for connecting a first component 16 with a second component 17. The first component 16 may, e.g., be the caliper bracket 4 and the second component 17 may be the caliper housing 5 or the axle assembly or vice versa. As illustrated in FIG. 5(a), the first and second components 16, 17 may be mounted to one another using a bolt 10, which may, e.g., engage with an inner thread of the first component 16. In another arrangement, the first and second components 16, 17 may be mounted to one another using a bolt 10 and nut 18, as shown in FIG. 5(b), using a stud 19 and two nuts 18, 18', as shown in FIG. 5(c), using a bolt 10 and two nuts 18, 18', as shown in FIG. 5(d), or using a stud 19 and three nuts 18, 18', 18", as shown in FIG. 5(e). The first connection means 8, 9 may make use of any one of the arrangements shown in FIGS. 5(a) to 5(e), while the second connecting means 8', 9' may make use of another one of the arrangements shown in FIGS. 5(a) to 5(e) to achieve the different masses of the first connecting means 8, 9 and the second connecting means 8', 9'.

Figure 6A:
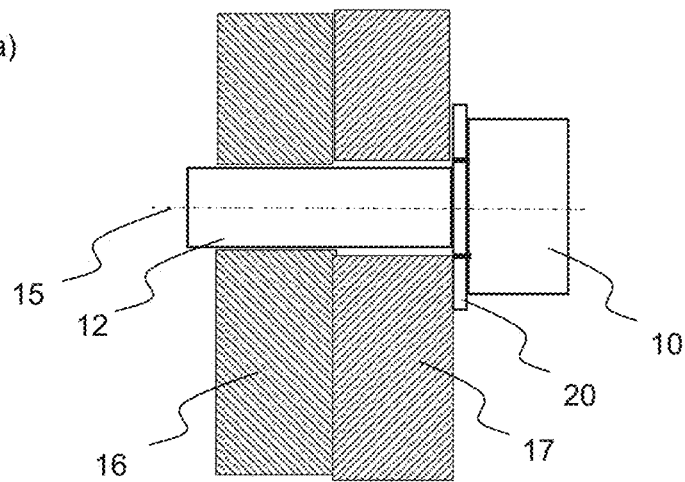
FIGS. 6(a) to (c) show schematic cross-sectional views of further connecting means according to different embodiments.
Figure 6B:
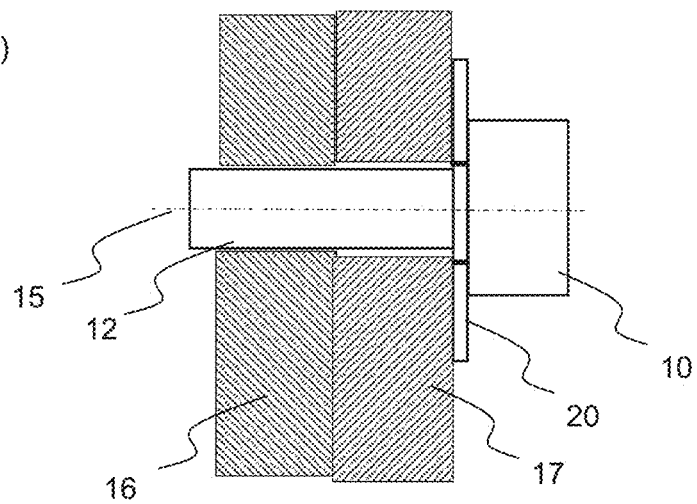
Figure 6C:
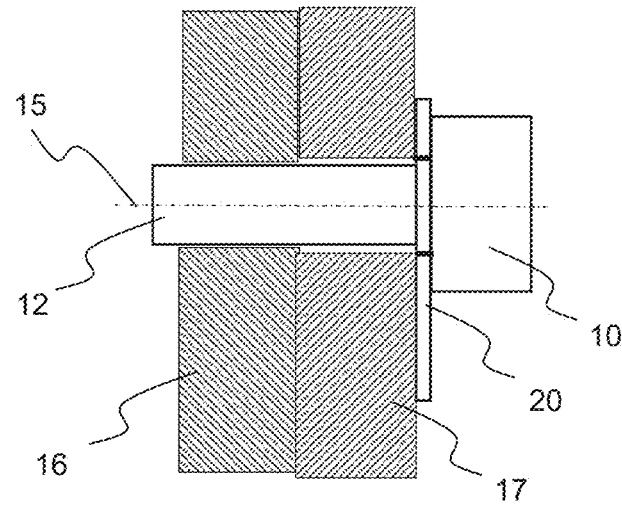

As shown in FIGS. 6(a) to 6(c), the first connecting means 8, 9 and/or the second connecting means 8', 9' may comprise a washer 20. The washers shown in the embodiments are approximately disk-shaped and have a hole for receiving the shaft 12 of the bolt 10. A centre of the hole of the washer 20 may define a longitudinal axis 15 of the washer, which coincides with the longitudinal axis of the bolt 10. The washer 20 of FIG. 6(b) has a larger diameter than the washer 20 of FIG. 6(a) for additional mass of the connecting means. The washer 20 of FIG. 6(c) has an asymmetric mass distribution with respect to the longitudinal axis 15, because the hole of the washer 20 is not in the centre. The mass distribution of the brake caliper 2 can be carefully adjusted by choosing a particular rotational orientation of the asymmetric washer 20 with respect to the longitudinal axis 15. The first connecting means 8, 9 may make use of any one of the arrangements shown in FIGS. 6(a) to 6(c), while the second connecting means 8', 9' may make use of another one of the arrangements shown in FIGS. 6(a) to 6(c) to achieve the different masses of the first connecting means 8, 9 and the second connecting means 8', 9'.

Figure 7A:
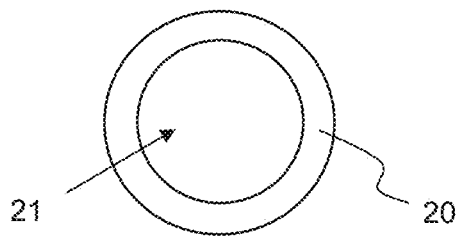
FIGS. 7(a) to (d) show schematic top view of washers according to different embodiments.
Figure 7B:
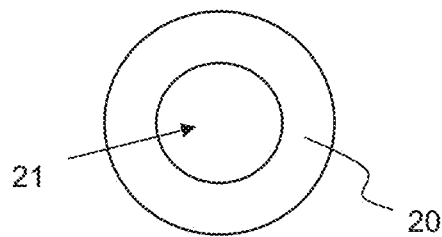
Figure 7C:
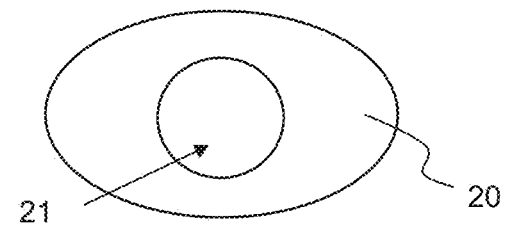
Figure 7D:
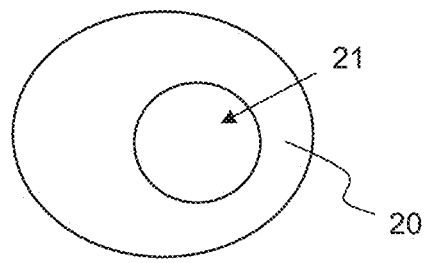

FIGS. 7(a) to 7(d) show different embodiments of washers 20, which may be used to adjust the mass distribution of the brake caliper 2 for noise reduction and to ensure that the first connecting means 8, 9 and second connecting means 8', 9' have different masses. The washers 20 of FIGS. 7(a) to 7(c) each have a hole 21 in the centre and a centre of mass that coincides with the longitudinal axis 15, i.e., with a centre of the hole 21. The washers 20 of FIGS. 7(a) to 7(c) have different shape and dimension and different masses. The washer 20 of FIG. 7(c) has a 2-fold rotational symmetry, which enables to adjust the mass distribution of the connecting means by rotation of the washer to some degree. The washer 20 of FIG. 7(d) has a hole 21 that is off-centre and has a 1-fold rotational symmetry, i.e., no particular symmetry. Precise adjustment of the mass distribution can be achieved using a washer as shown in FIG. 7(d). For example, the first connecting means 8, 9 may make use of any one of the washers shown in FIGS. 7(a) to 7(d), while the second connecting means 8', 9' may make use of another one of the washers shown in FIGS. 7(a) to 7(d) to achieve the different masses of the first connecting means 8, 9 and the second connecting means 8', 9'.

Features of the different embodiments which are merely disclosed in the exemplary embodiments may be combined with one another and may also be claimed individually.

What is claimed is:

1. A brake caliper for a disk brake system, comprising
a caliper bracket and a caliper housing,
a first connecting means and a second connecting means,
wherein the first connecting means and the second connecting means are each configured to mount the caliper bracket to the caliper housing
or
wherein the first connecting means and the second connecting means are each configured to mount the caliper bracket to an axle assembly,
wherein a mass of the first connecting means is different from a mass of the second connecting means, and
wherein a bolt of the first connecting means and/or a bolt of the second connecting means has a bolt head that is off-center.

2. The brake caliper of claim 1, characterized in that a mass of the first connecting means is at least 10 g larger than a mass of the second connecting means.

3. The brake caliper of claim 1, characterized in that the first connecting means and/or the second connecting means comprises a bolt.

4. The brake caliper of claim 1, characterized in that the first connecting means and the second connecting means each comprise a corresponding body, wherein the corresponding body of the first connecting means has a mass that is different from a mass of the corresponding body of the second connecting means.

5. The brake caliper of claim 4, characterized in that the corresponding body of the first connecting means as well as the corresponding body of the second connecting means are each one of a bolt, a screw, a nut, a washer, and a threaded rod.

6. The brake caliper of claim 4, characterized in that the corresponding body of the first connecting means is made of a first material, wherein the corresponding body of the second connecting means is made of second material, wherein the first material has a different density than the second material.

7. The brake caliper of claim 4, characterized in that the corresponding body of the first connecting means has a different shape and/or dimension than the corresponding body of the second connecting means.

8. The brake caliper of claim 1, characterized in that a body of the first connecting means and/or a body of the second connecting means has an asymmetric mass distribution.

9. The brake caliper of claim 1, characterized in that a washer of the first connecting means and/or a washer of the second connecting means has an asymmetric mass distribution.

10. The brake caliper of claim 1, characterized in that the first connecting means and the second connecting means are each configured to mount the caliper bracket to the axle assembly.

11. The brake caliper of claim 1, characterized in that the first connecting means and the second connecting means are each configured to slidably mount the caliper bracket to the caliper housing.

* * * * *